UNITED STATES PATENT OFFICE.

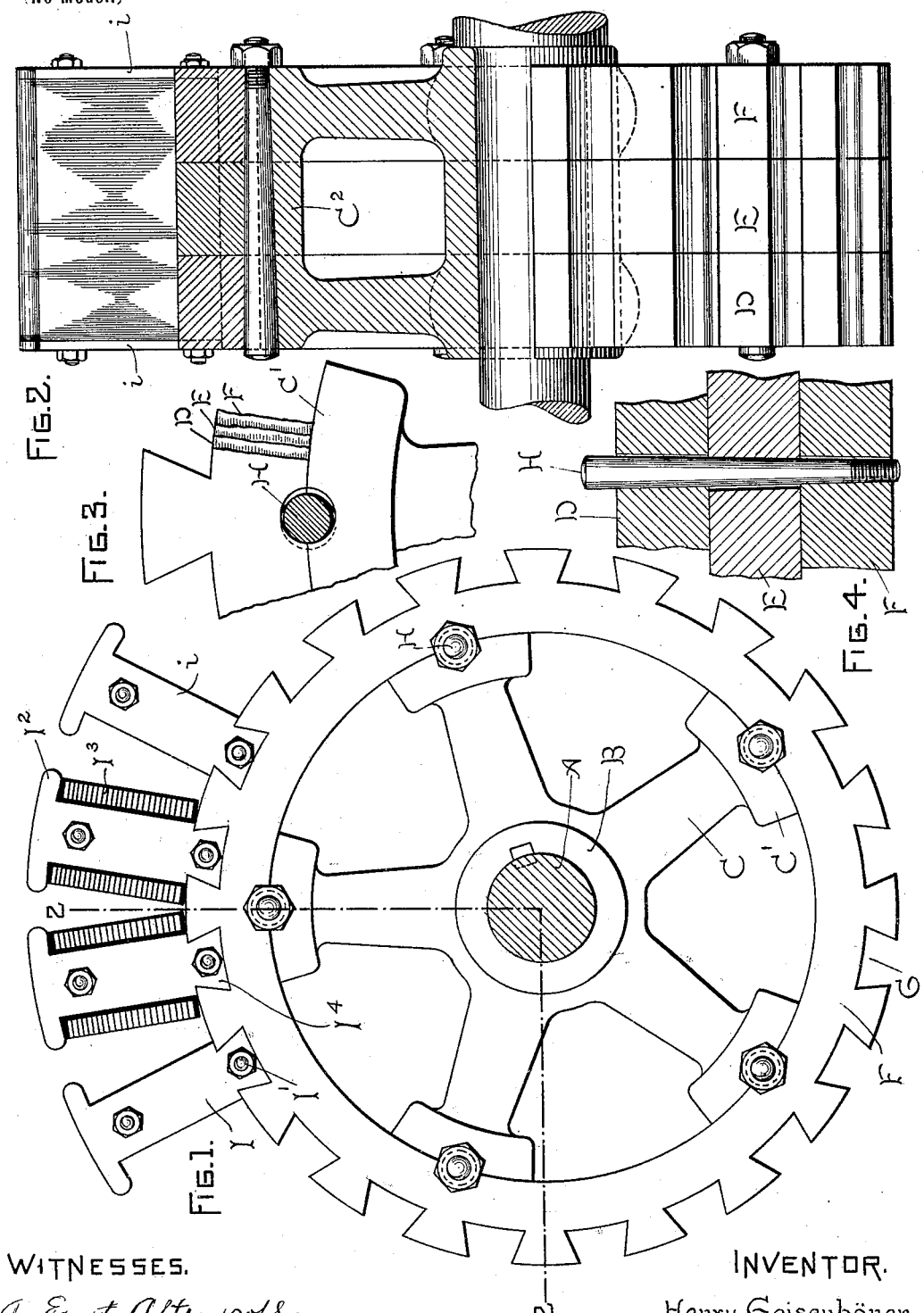

HENRY GEISENHÖNER, OF SCHENECTADY, NEW YORK, ASSIGNOR TO THE GENERAL ELECTRIC COMPANY, OF NEW YORK.

MEANS FOR SECURING POLE-PIECES.

SPECIFICATION forming part of Letters Patent No. 656,961, dated August 28, 1900.

Application filed October 6, 1898. Serial No. 692,773. (No model.)

*To all whom it may concern:*

Be it known that I, HENRY GEISENHÖNER, a citizen of the United States, residing at Schenectady, in the county of Schenectady, State of New York, have invented certain new and useful Improvements in Means for Securing Pole-Pieces, (Case No. 453,) of which the following is a specification.

My invention relates to a means employed for securing detachable pieces to a hub or cylindrical support, and has for its object to provide a simple arrangement, particularly applicable to field-magnets of dynamo-electric machines, whereby a number of detachable pieces may be simultaneously secured to their support by a single means.

It also relates to certain features of construction hereinafter more fully described and claimed.

In the accompanying drawings, which show an application of my invention to a dynamo-electric machine of the revolving field type, Figure 1 is a front elevation of a field-magnet structure with a number of pole-pieces mounted in place. Fig. 2 is a side elevation with a quarter-section removed, the section being taken on the line 2 2 of Fig. 1; and Figs. 3 and 4 are detail views.

I have shown my invention applied to the revolving field-magnet of a dynamo-electric machine; but it is equally applicable to a stationary field-magnet construction, as well as to other uses.

Mounted on a shaft A for rotary movement and keyed thereto is a spider having a hub B and a number of unconnected arms C. These arms are provided with enlarged heads C', which are machined and form seats for the steel rings D, E, and F, which support the pole-pieces and also form a part of the magnetic circuit. On account of the large size of the machine a double set of arms C is provided, the arms of one set being placed in line with those of the second set and connected by a web $C^2$. The outer rings D and F are shrunk upon the heads of the arms in a manner well understood, while the middle ring E is arranged to make a working fit and to be capable of a slight circumferential movement. Extending across the periphery of the rings and parallel with the shaft are a number of dovetail slots G, the number of slots depending upon the number of poles to be employed. The rings D and F are further secured upon the arm-heads C' by the taper bolts H, each arm being provided with a single bolt, but, if desired, more than one bolt may be provided for each arm. The holes for the bolts are bored on the line of the joint between the rings and the arm-heads, so that a half of each hole is in one part and half in the other. The bolt-holes in the movable ring E correspond to those in the other rings, except that they are placed in a slightly-different position with respect to the dovetail slots G. In other words, they are so situated that when the dovetail slots on the three rings are placed in line the ring E will be slightly displaced circumferentially from the holes in the rings D and F, so that when the bolts are driven home the ring E will be given a slight circumferential motion. Mounted in the slots G are radially-extending laminated pole-pieces I, having dovetail projections $I^4$ and enlarged heads $I^2$ for retaining the field-coils $I^3$ in place. The laminæ are assembled in any suitable manner and are held together by the bolts I', end plates $i$, Fig. 2, being employed in the usual manner to hold the end laminations in place. The pole-pieces are so arranged that the dovetail projections make a working fit with the grooves G, so that the poles after releasing the bolts H may readily be removed when desired by moving them laterally in either direction from a central position.

In constructing the machine it is preferable to shrink the rings F and D on the spider-arm heads with the movable ring E between them. The dovetail grooves are then cut in the rings, after which the movable ring is moved slightly circumferentially and the taper holes for the bolt H bored. With this arrangement the holes in the movable ring are offset sufficiently to permit the bolts to move the ring and cause the metal forming the side of the groove to grip the pole.

In assembling, a coil is first placed around each pole-piece and the pole-piece slipped into position. After all of the pole-pieces have been mounted in place the taper bolts H are driven home, which causes the middle ring E to move circumferentially on the arm-heads, and the metal forming one side of the dovetail groove will engage with the dovetail projection and force the pole-piece against the opposite side of the groove of the fixed rings D and F. After the bolts have been seated nuts H' are employed to hold them in place.

It is evident that the clamping-rings E could be made in sections and the sections secured together in any suitable manner, in which case the rings D and F would preferably be cast in a single piece and either mounted on a spider having unconnected arms or upon a support resembling a pulley. Furthermore, it is obvious that the rings D and F might be cast integral with such a pulley, or they might be in the form of segments cast on the heads of the spider. It is not essential that the movable ring E have a ring on each side, nor if there be a ring on each side that any two of the rings be connected rigidly together.

For the purpose of illustration my invention is shown as applied to a dynamo-electric machine; but I do not limit myself to this construction, for it is applicable to various other types of apparatus.

What I claim as new, and desire to secure by Letters Patent of the United States, is—

1. The combination with a rotatable member adapted to detachably receive independent members, and provided with one or more bolt-holes, of a movable ring fitting said rotatable member and also provided with one or more bolt-holes offset from the bolt-holes of said rotatable member, independent members attached to said rotatable member and to said ring, and tapered bolts adapted to be forced through said bolt-holes to move said ring circumferentially and lock it to clamp said independent members rigidly to said rotatable member.

2. The combination with a rotatable member adapted to detachably receive independent members, of a movable ring fitting said rotatable member and adapted to detachably receive independent members, independent members attached to said rotatable member and to said ring, and means for moving said ring circumferentially and locking it in the position to which it may have been moved.

3. The combination of an annular structure made up of a fixed and a movable element, grooves extending continuously across the periphery of the movable and the stationary elements, detachable pieces having projections mounted in the grooves, and means for moving one of the elements circumferentially with respect to the other.

4. The combination of an annular structure made up of a fixed and a movable element, dovetail grooves extending continuously across the periphery of the movable and the stationary elements, detachable pieces having dovetail projections mounted in the grooves, and means for moving one of the elements circumferentially with respect to the other to grip the detachable pieces.

5. The combination of a spider having any number of rings secured thereto, a movable ring supported by the spider in proximity to the stationary rings, slots formed in and extending continuously across all the rings, detachable pieces mounted in the slots, and means for moving the movable ring circumferentially against said pieces and for securing it in the position into which it has been moved.

6. In a dynamo-electric machine, the combination of a support, fixed rings moving with the support, a loose ring mounted upon the support, dovetail slots in both the moving and fixed rings, detachable pole-pieces mounted in the slots, and means for adjusting the loose ring circumferentially to grip the pole-pieces.

7. In a dynamo-electric machine, the combination of a spider, a support, a pair of rings movable with respect to each other carried by the support, dovetail slots in the two rings, detachable pole-pieces mounted in the slots, and a taper bolt or wedge for moving the two rings with respect to each other.

8. In a dynamo-electric machine, the combination of a spider, a pair of fixed rings shrunk on the spider, a movable ring mounted between the fixed rings, and taper bolts so situated between the spider and the rings as to prevent independent movement thereof and also to adjust the moving ring with respect to the stationary rings.

9. The combination with a wheel adapted to detachably receive independent members on its periphery, of the pole-pieces for an electric machine attached to the periphery of said rotatable member, and means for simultaneously clamping all of said pole-pieces to the periphery of said rotatable member.

10. In a dynamo-electric machine, the combination of a support, a plurality of detachable pole-pieces mounted in retaining-slots in the support and capable of being withdrawn laterally, and a single device for simultaneously clamping all of the pole-pieces against lateral movement in either direction.

11. In a dynamo-electric machine, the combination of a rotatable spider, a support mounted thereon, detachable pole-pieces, and a single means for securing the support to the spider and simultaneously clamping all of the pole-pieces against lateral movement in either direction.

12. In a dynamo-electric machine, the combination of two rings which form a support for the pole-pieces and are included in the magnetic circuit, detachable pole-pieces attached to the rings, a third ring located between the first-named rings and forming a part of the magnetic circuit, and means for adjusting the third ring circumferentially with respect to the other rings.

13. The combination with a wheel adapted to detachably receive independent members on its periphery, and having one or more bolt-holes, of a movable ring also adapted to detachably receive independent members and provided with one or more bolt-holes offset from the bolt-holes in said wheel, a number of pole-pieces for an electric machine attached to the periphery of said wheel and to said movable ring, and tapered bolts adapted to be forced through said bolt-holes to move said ring circumferentially and to lock it to clamp said pole-pieces rigidly to said wheel.

14. The combination with a rotatable member adapted to detachably receive independent members, of a movable ring fitting said rotatable member and adapted to detachably receive independent members, independent members attached to said rotatable member and to said ring, and means for moving said ring circumferentially and locking it in the position to which it may have been moved.

15. The combination with a rotatable structure having a number of grooves, of independent members detachably mounted in the grooves, and a ring mounted on said structure and adapted to be moved circumferentially to lock said independent members in position in their respective grooves.

16. In an electric machine, the combination with a grooved field-magnet support, of pole-pieces detachably mounted upon said support and retained by said grooves, and means for simultaneously clamping said pole-pieces in position.

17. The combination with the spider having enlarged ends, of the ring mounted thereon, the pole-pieces mounted on the rings, and the bolts preventing the rings from moving circumferentially on the spider-arms.

18. The combination with a support formed with grooves, of pole-pieces detachably mounted in said grooves, and means for pressing all the pole-pieces simultaneously against the walls of the grooves to retain them in position therein.

In witness whereof I have hereunto set my hand this 4th day of October, 1898.

HENRY GEISENHÖNER.

Witnesses:
   B. B. HULL,
   C. L. HAYNES.